United States Patent
Klinghult et al.

(10) Patent No.: US 7,576,798 B2
(45) Date of Patent: Aug. 18, 2009

(54) MOBILE TERMINALS INCLUDING IMAGE SENSOR INTEGRATED FLASH SENSING CIRCUITS AND METHODS OF OPERATING THE SAME

(75) Inventors: Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 547 days.

(21) Appl. No.: 11/450,227

(22) Filed: Jun. 9, 2006

(65) Prior Publication Data
US 2007/0296852 A1  Dec. 27, 2007

(51) Int. Cl.
  H04N 5/222 (2006.01)
(52) U.S. Cl. .................. 348/371; 348/370
(58) Field of Classification Search .......... 348/294, 348/301, 370–371; 455/556.1–556.2, 557
See application file for complete search history.

(56) References Cited

U.S. PATENT DOCUMENTS 6,151,073 A * 11/2000 Steinberg et al. ............ 348/371
6,441,856 B1 * 8/2002 Sugimoto .................... 348/371
6,961,091 B1 * 11/2005 Kubo .......................... 348/370
7,369,166 B2 * 5/2008 Fossum et al. .............. 348/308
7,471,332 B2 * 12/2008 Tohyama ..................... 348/371

FOREIGN PATENT DOCUMENTS

| EP | 1387562 A2 * | 7/2003 |
| EP | 1 387 562 A2 | 2/2004 |
| JP | 2002-49083 A | 2/2002 |
| JP | 2005-17349 A | 1/2005 |
| JP | 2005-181602 A | 7/2005 |
| KR | 10-2005-0096021 A | 5/2005 |

OTHER PUBLICATIONS

International Search Report and Written Opinion for PCT/EP2006/068110; date of mailing March 256, 2007.

* cited by examiner

*Primary Examiner*—Jason Chan
*Assistant Examiner*—Pritham Prabhakher
(74) *Attorney, Agent, or Firm*—Myers Bigel Sibley & Sajovec, P.A.

(57) ABSTRACT

A mobile terminal can include a flash coupled to a mobile terminal housing and configured to provide light from the mobile terminal to illuminate a subject. An image sensor circuit is coupled to the flash and includes a plurality of first image sensing elements configured to provide image data representative of the subject. A flash sensing circuit is coupled to the image sensor circuit and is configured to measure the light provided by the flash using second image sensing element in image sensor circuit. Related cellular radiotelephones and methods are also disclosed.

18 Claims, 4 Drawing Sheets

MOBILE TERMINALS INCLUDING IMAGE SENSOR INTEGRATED FLASH SENSING CIRCUITS AND METHODS OF OPERATING THE SAME

BACKGROUND

Digital cameras used in cellular radiotelephones may typically be used at light levels down to 5 to 10 lux and, therefore, may include a flash, such as a Flash or discharge tube for low light use. However, the inclusion of a flash (along with related additional components) into a mobile phone can increase the cost and/or appeal of such devices as the mobile phone may be larger than otherwise desirable.

Some digital cameras may include systems that adjust flash operation based on scene characteristics, such as the amount of reflected light coming from a scene and/or distance to a subject in the scene. For example, U.S. Pat. No. 6,151,073 to Steinberg et al. and U.S. Pat. No. 6,441,856 to Sugimoto describe flash systems for digital cameras that receive light data from one or more pre-flashes and responsively determine a desirable flash energy for image capture. While such techniques may provide desirable results, they may be too complex and/or costly to use in lower cost digital cameras, such as those that may be included in a multifunction device, such as a mobile terminal or personal digital assistant (PDA).

SUMMARY

Embodiments according to the invention can provide mobile terminals including image sensor integrated flash sensing circuits and methods of operating the same. Pursuant to these embodiments, a mobile terminal can include a flash coupled to a mobile terminal housing and configured to provide light from the mobile terminal to illuminate a subject. An image sensor circuit is coupled to the flash and includes a plurality of first image sensing elements configured to provide image data representative of the subject. A flash sensing circuit is coupled to the image sensor circuit and is configured to measure the light provided by the flash using second image sensing element in image sensor circuit.

In some embodiments according to the invention, a cellular radiotelephone includes a transceiver circuit that is operative to transmit and receive radio frequency communication signals between a network and the cellular radio telephone via an antenna system. A processor circuit is coupled to the transceiver circuit and is configured to provide operation of the cellular radio telephone including coordination of communications via the transceiver circuit. A digital camera sub-system is included in the cellular radiotelephone and is coupled to the processor circuit, where the digital camera sub-system is configured to measure image data representative of a subject. A flash is coupled to the cellular radio telephone and is configured to provide light to illuminate the subject. An image sensor circuit is coupled to the flash and includes a plurality of first image sensing elements configured to provide image data representative of the subject and a plurality of second image sensing elements configured to provide flash data representative of a level of the light provided by the flash. A flash sensing circuit is coupled to the image sensor circuit and is configured to measure the light provided by the flash using the plurality of second image sensing elements.

In some embodiments according to the invention, a cellular radiotelephone includes a transceiver circuit that is operative to transmit and receive radio frequency communication signals between a network and the cellular radio telephone via an antenna system. A processor circuit is coupled to the transceiver circuit and is configured to provide operation of the cellular radiotelephone including coordination of communications via the transceiver circuit. A flash is coupled to the cellular radio telephone, and is configured to provide light from the cellular radio telephone to illuminate a subject. A digital camera sub-system is included in the cellular radiotelephone and is coupled to the processor circuit, where the digital camera sub-system is configured to measure image data representative of a subject and to measure the light provided by the flash through a lens of the cellular radio telephone.

In some embodiments according to the invention, a method of operating a digital camera sub-system in a mobile terminal includes activating a flash in the mobile terminal to provide light from the mobile terminal to illuminate a subject, measuring the light using an image sensor circuit in the mobile terminal to provide an indication of a level of the light provided by the flash to the subject, and measuring the light using the image sensor circuit to provide image data representative of the subject.

DESCRIPTION OF EMBODIMENTS ACCORDING TO THE INVENTION

Figure 1:
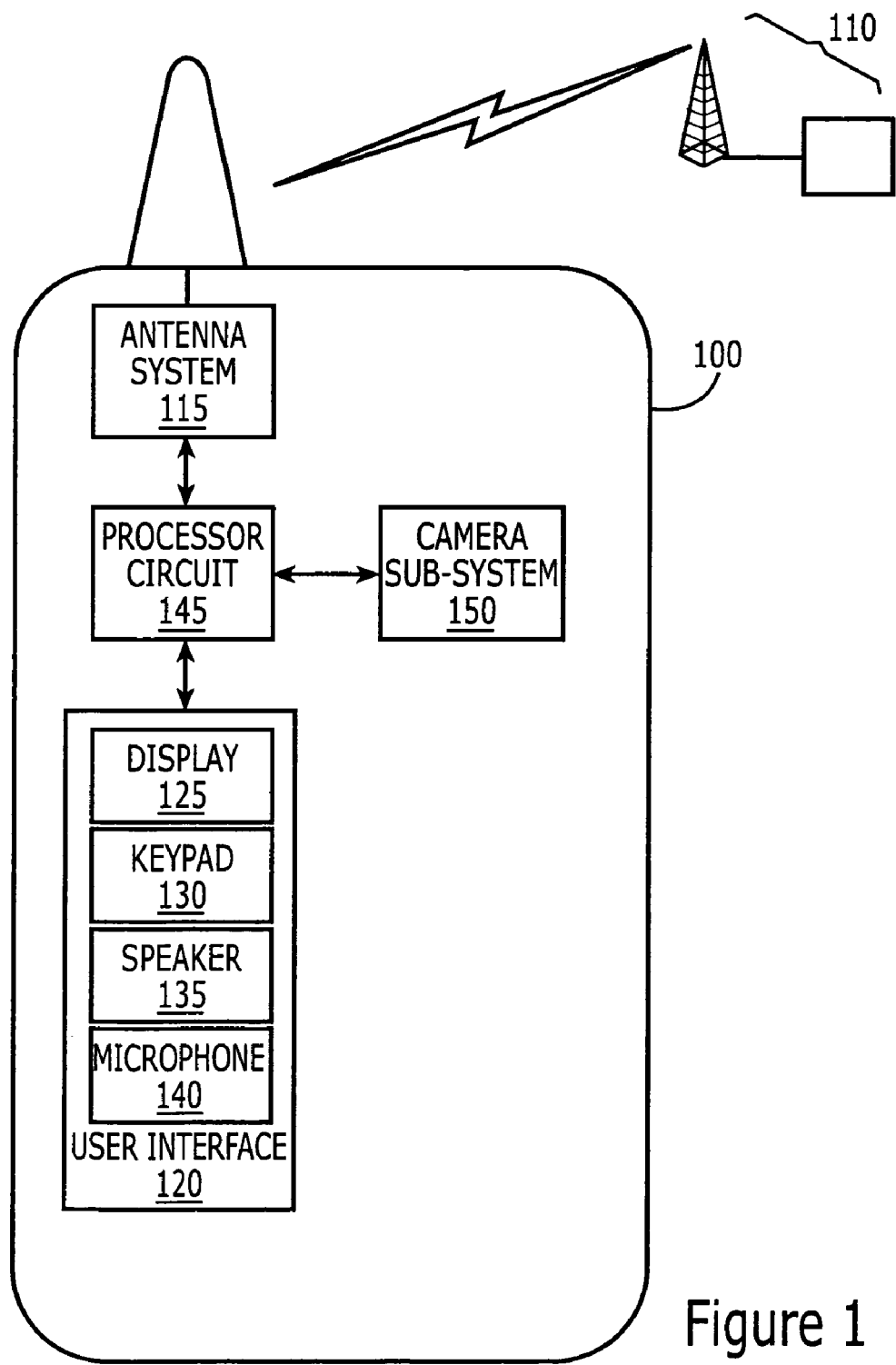
FIG. 1 is a block diagram that illustrates mobile terminals according to some embodiments of the invention.

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be emphasized that the term "comprises/comprising" when used in this specification is taken to specify the presence of stated features, integers, steps or components but does not preclude the presence or addition of one or more other features, integers, steps, components or groups thereof.

It will be understood that although the terms first and second may be used herein to describe various components these components should not be limited by these terms. These terms are only used to distinguish one component from another. Thus, for example, a first component discussed below could be termed a second component without departing from the teachings of the present invention.

The invention is described with reference to block diagrams of mobile terminals, communications networks, and operations thereof according to embodiments of the invention. It will be understood that each block and combinations of blocks, may be implemented by computer program instructions. These computer program instructions may be provided to a processor circuit of a general purpose computer, special purpose computer, or other programmable data processing apparatus to produce a machine, such that the instructions, which execute via the processor of the computer or other programmable data processing apparatus, create means for implementing the functions specified in the blocks.

It will be understood that the invention may be practiced with any mobile terminal that operates in a communications network. A mobile terminal may be, for example, a single or dual mode cellular radio telephone with or without a multi-line display; a Personal Communications System (PCS) terminal that may combine a cellular radio telephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop receiver or other appliance all of which include a radiotelephone transceiver.

It will be understood mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

As described herein below in greater detail, in some embodiments according to the invention, mobile terminals can include an image sensor circuit that provides flash data to a flash sensing circuit. The flash sensing circuit can be configured to determine whether a flash has provided adequate light to a subject, whereupon the flash may be terminated. In some embodiments according to the invention, the image sensor circuit includes a plurality of first image sensing elements that are dedicated to providing image data that represent the subject illuminated by the flash and a plurality of second sensing elements that are dedicated to providing flash data to the flash sensing circuit. Accordingly, the flash data can be processed to determine whether the flash has provided adequate illumination of the subject so that the image data may be measured. In other embodiments according to the invention, the image sensing elements used to provide the flash data to the flash sensing circuit can also be used to provide image data to the processor circuit.

It will be understood that, although the term "image sensing element" is used herein to refer to elements used to measure the light, the "image sensing element" may or may not be used to actually provide image data. For example, as described herein in greater detail, an "image sensing element" may be an element included on the substrate within the array only to measure the sufficiency of light provided by the flash and not to provide an image. Accordingly, such dedicated elements may be added to the substrate without adding much additional cost to the array.

In still other embodiments according to the invention, a single sensing element can be used to provide the flash data. In other embodiments according to the invention, more than one sensing element is used. For example, in some embodiments according to the invention, the image sensing elements used to provide the flash data can be arranged in a symmetrical pattern within an array of image sensing elements. In yet other embodiments according to the invention, the image sensing elements used to provide the flash data can be separated from one another, such as in being located in different quadrants or regions of the array. In still further embodiments according to the invention, the flash sensing circuit can measure the light provided by the flash via the lens of the mobile terminal camera sub-system.

Accordingly, the use of some of the image sensing elements within an image sensing device to measure the light provided by a flash may reduce the need for a separate flash sensor which may otherwise increase the cost of the mobile terminal and/or impose additional constraints in the housing of the mobile terminal. Measureing the light through the lens of the camera sub-system of the mobile terminal may further address the packaging constraints described above as well as provide a more accurate indication of the amount of light provided to the subject by the flash.

Furthermore, coupling the image sensing elements in the array to circuits dedicated to determining the adequacy of the light provided by the flash can allow a camera sub-system according to the present invention to operate faster than conventional approaches. For example, having some of the image sensing elements "hardwired" to amplifiers etc. used to determine whether the flash has provided adequate light can avoid the need for extensive processing by a processor circuit that operates with the sub-system.

Figure 2:
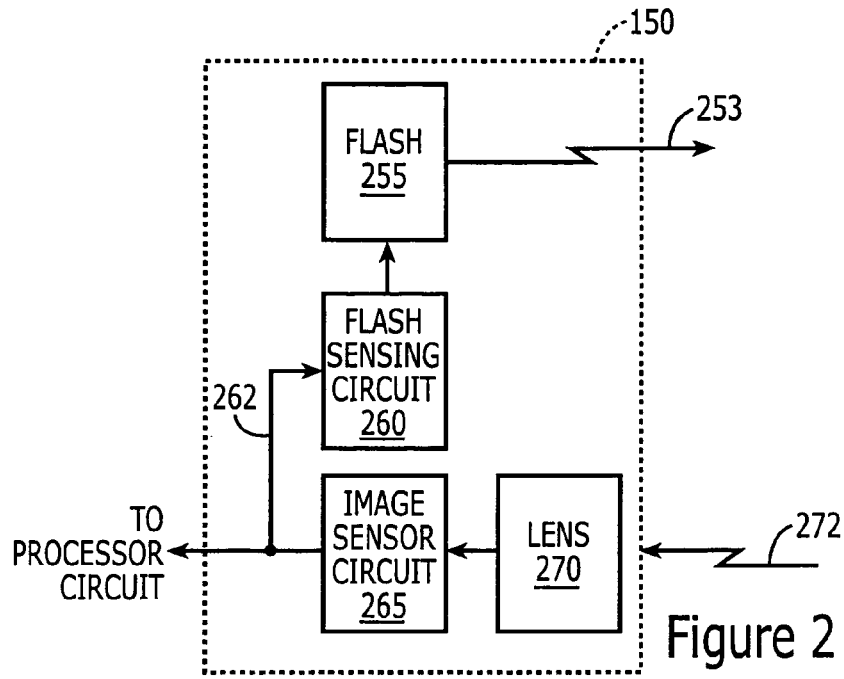
FIG. 2 is a block diagram that illustrates camera sub-systems in mobile terminals according to some embodiments of the invention.

FIG. 1 is a block diagram that illustrates embodiments of mobile terminals according to the invention. As illustrated in FIG. 2, the mobile terminal 100 includes a transceiver circuit 105 that is operative to transmit and receive radio frequency communication signals to the network 110 via an antenna system 115. The antenna system 115 may include an antenna feed structure and one or more antennas.

A transmitter portion of the transceiver 105 converts information, which is to be transmitted by the mobile terminal 100, into electromagnetic signals suitable for radio communications. A receiver portion of the transceiver 105 demodulates electromagnetic signals, which are received by the mobile terminal 100 from the network 110 to provide the information contained in the signals in a format understandable to the user.

A user interface 120 of the mobile terminal 100 may include a variety of components, such as a display 125, a keypad 130, a speaker 135, and a microphone 140, operations of which are known to those of skill in the art. It will be understood that the functions of the keypad 130 and the display 125 can be provided by a touch screen through which the user can view information, provide input thereto, and otherwise control the mobile terminal 100.

A processor circuit 145 provides for overall operation of the mobile terminal 100 including coordination of communications via the transceiver circuit 105, the user interface 120, and other components included in the mobile terminal 100. For example, the processor circuit 145 can provide communications signals to the transceiver circuit 105 when the user speaks into the microphone 140 and receives communications signals from the transceiver 105 for the reproduction of audio through the speaker 135. The processor circuit 145 can generate characters on the display 125. For example, the processor circuit 145 can generate numbers for display when the user enters a telephone number on the keypad 130. The characters can also be generated by a character generator circuit, which is not shown.

The processor circuit 145 may be implemented using a variety of hardware and software. For example, operations of the processor circuit 145 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 145 may provide digital signal processing operations such as scanning for an acceptable control channel, camping on a control channel (including maintaining synchronization with the base station that communicates with the mobile terminal 100), Voice Activated Dialing (VAD) services, performing media operations and the like.

The mobile terminal 100 also includes a digital camera sub-system 150 coupled to the processor circuit 145. The digital camera sub-system 150 is configured to capture digital image data representative of subjects. In particular, the digital camera sub-system 150 can provide image data to the processor circuit 145 which may store, transmit, or otherwise process the image data. It will be understood that the digital camera sub-system 150 can operate under the control of the processor circuit 145 which may provide, for example, input activating/deactivating the digital camera sub-system 150 as well as inputs controlling the operating parameters of the digital camera sub-system 150, such as when the digital camera sub-system 150 is to capture an image of the subject in response to, for example, user input. It will be further understood that the digital camera sub-system 150 can provide parameters, such as operating conditions, to the processor circuit 145 which may then alter the control of the digital camera sub-system 150 in response thereto. For example, the digital camera sub-system 150 may indicate that image data has been captured and is ready for transfer by the processor circuit 145.

FIG. 2 is a block diagram that illustrates the digital camera sub-system 150 shown in FIG. 1 according to some embodiments of the invention. In particular, the digital camera sub-system 150 includes a lens 270 that is positioned to receive light 272 reflected from a subject illuminated by light 253 from a flash 255. In some embodiments according to the invention, the flash 255 can be a xenon flash or a light emitting diode flash. The lens 272 is optically coupled to an image sensor circuit 265, which is configured to measure the light 272 to provide image data and flash data therefrom. The image sensor circuit 265 includes an array of image sensing elements that are configured to convert the light 272 to corresponding digital values at each element in the array. The digital values correspond to the intensity of that portion of the light impinging on the respective sensing element within the array.

It will be understood that the term "measure" used herein in conjunction with, for example, the light provided via the lens means that the light is provided to indicate whether the amount is adequate. Moreover, in some embodiments according to the invention, the term "measure" does not require that a value of the amount of light be determined.

In some embodiments according to the invention, the image sensor circuit 265 can be a CMOS image sensor device, which may allow access to individual elements within the array by the processor circuit 145. For example, in some embodiments according to the invention, the processor circuit 145 can be used to read a digital value associated with any particular sensing element within the image sensor array. In still other embodiments according to the invention, the processor circuit 145 may read digital values from more than one sensing element at a time. It will be understood that the image sensor circuit 265 can include a plurality of amplifiers configured to amplify the values stored in by the sensing elements to provide the digital values from the array at levels more suitable for processing by other circuits. Alternatively, the image sensor circuit 265 can be a Charge-coupled device or any other circuit capable sensing light to provide image data representative of a subject.

It will be understood that in operation, the image sensor circuit 265 can provide flash data responsive to the light 253 provided by the flash 255 reflected from the subject (as light 272) through the lens 270. Moreover, the image sensor circuit 265 can also provide image data to the processor circuit 145 once the digital camera sub-system 150 has determined that the flash 255 has provided the light 253 at a level that is adequate to illuminate the subject so that the image sensor circuit 265 may measure the light 272 to provide a higher quality image of the subject. Accordingly, the image sensor circuit 265 can provide both flash data and image data.

The digital camera sub-system 150 also includes a flash sensing circuit 260 coupled to the image sensor 265. The flash sensing circuit 260 is also coupled to the flash 255 and operates to activate/deactivate the flash 255 based on the flash data 262 provided by the image sensor circuit 265. In particular, in operation, the flash sensing circuit 260 activates the flash 255 to provide the light 25 so that the light 272 is provided to the image sensor circuit 260 via the lens 270. The flash sensing circuit 265 continues activation of the flash 255 until the flash data from the image sensor circuit 265 indicates that adequate illumination has been provided by the flash 255. Once the flash sensing circuit 260 determines that adequate light has been provided, the flash 255 can be deactivated.

Using the image sensor circuit 265 to determine whether adequate light has been provided to a subject can reduce the need for a separate flash sensor which (if otherwise required) may increase the cost of the mobile terminal and/or limit packaging options due to the inclusion of an additional sensor.

Figure 3:
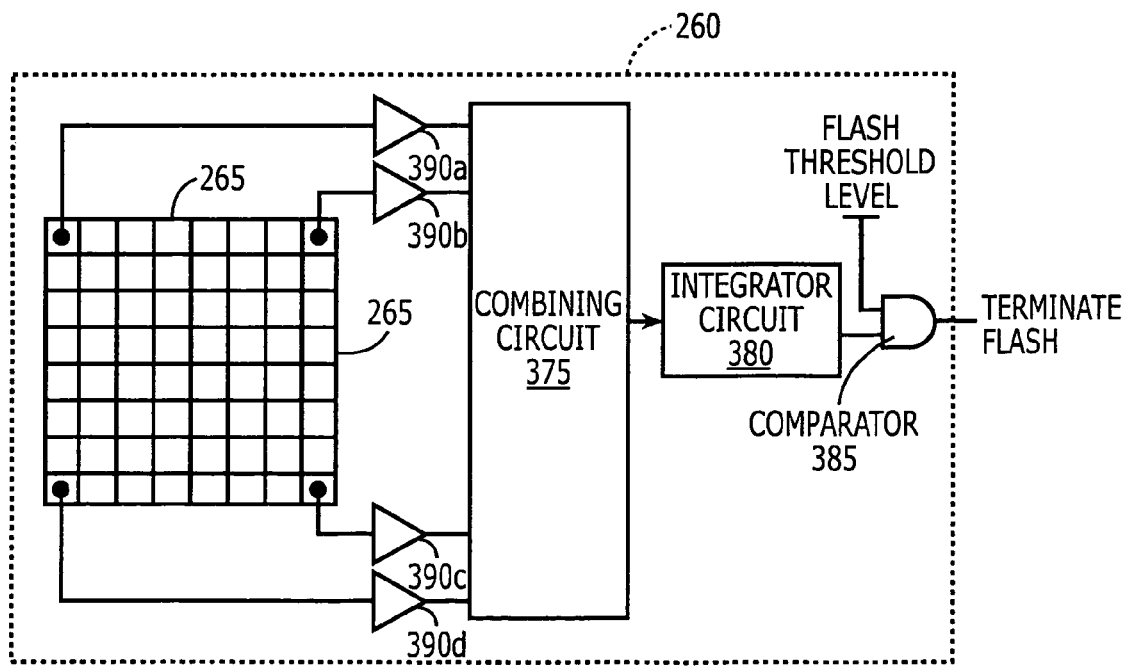
FIGS. 3-4 are block diagrams that illustrate flash sensing circuits coupled to image sensor circuits in mobile terminals according to some embodiments of the invention.

FIG. 3 is a block diagram that illustrates flash sensing circuits 260 coupled to image sensor circuits 265 in mobile terminals according to some embodiments of the invention. In particular, elements located in the four corners of an array of image sensing elements the image sensor circuit 265 are coupled to the flash sensing circuit 260. The four outer sensing elements coupled to the flash sensing circuit 260 represent a plurality of first image sensing elements from the array whereas the remainder of the image sensing elements represent a plurality of second image sensing elements, which are used for providing the image data representative of a subject. Accordingly, the four outer sensing elements of the array are dedicated to providing flash data 262 to the flash sensing circuit 260 to indicate the amount of light provided by the flash 255.

The flash sensing circuit 260 includes a plurality of flash data amplifier circuits 390A-D, wherein each is coupled to a respective one of the outer sensing elements used to measure the light provided by the flash 255. The flash data amplifier circuits 390A-D provide respective amplified flash data signals to a combining circuit 375. The combining circuit 375 combines the respective amplified flash data signals provided by the flash data amplifier circuits 390A-D to provide a combined flash data signal. It will be understood that the combined flash data signal can have an increased signal to noise ratio compared to the individual amplified flash data signals provided by the flash data amplifier circuits 390A-D. In some embodiments according to the invention, the combining circuit 375 is a summing amplifier circuit. Other circuits may be used to combine the individual amplified flash data signals.

The combined flash data signal is provided to an integrator circuit 380 which integrates the combined flash data signal over time to provide an indication of the total light provided by the flash 255 to the subject. The integrator circuit 380 provides a total flash output signal to a comparator 385 whereupon the total flash output signal is compared to a flash threshold level. In operation, once the total flash output signal from the integrator circuit 380 equals or exceeds the flash threshold level, the comparator 385 generates a signal to terminate activation of the flash 255.

Although the image sensor circuit 265 is shown having four sensing elements coupled to the flash sensing circuit 260 to provide the flash data, in other embodiments according to the invention, more or fewer image sensing elements may be used. Furthermore, the number of elements in the array can be large, such as three or more mega-elements (i.e. 3.6 megapixels). It will be further understood that the image sensor circuit 265 can include amplifier circuits that are separate from the plurality of flash data amplifier circuits 390A-D. In operation, the amplifiers included in the image sensor circuit 265 can be used to amplify the image data, whereas the separate plurality of flash data amplifier circuits 390A-D are used to amplify the flash data to a different level than that applied to the image data. In still further embodiments according to the invention, the elements used to measure the light provided by the flash 255 may be unused in measuring the image, whereas in other embodiments according to the invention, the elements used to measure the light provided by the flash 255 are also used to provide image data.

Figure 6A:
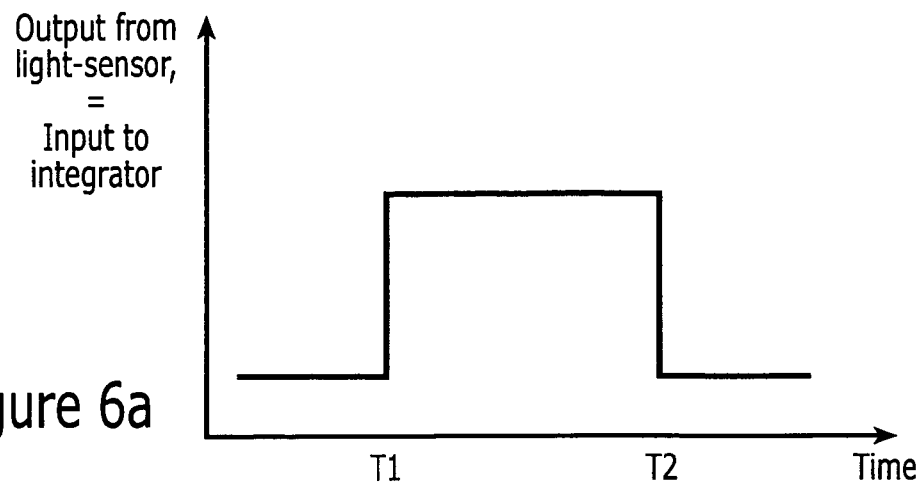
FIGS. 6A-C are timing diagrams that illustrate operations of flash sensing circuits in mobile terminals according to some embodiments of the invention.
Figure 6B:
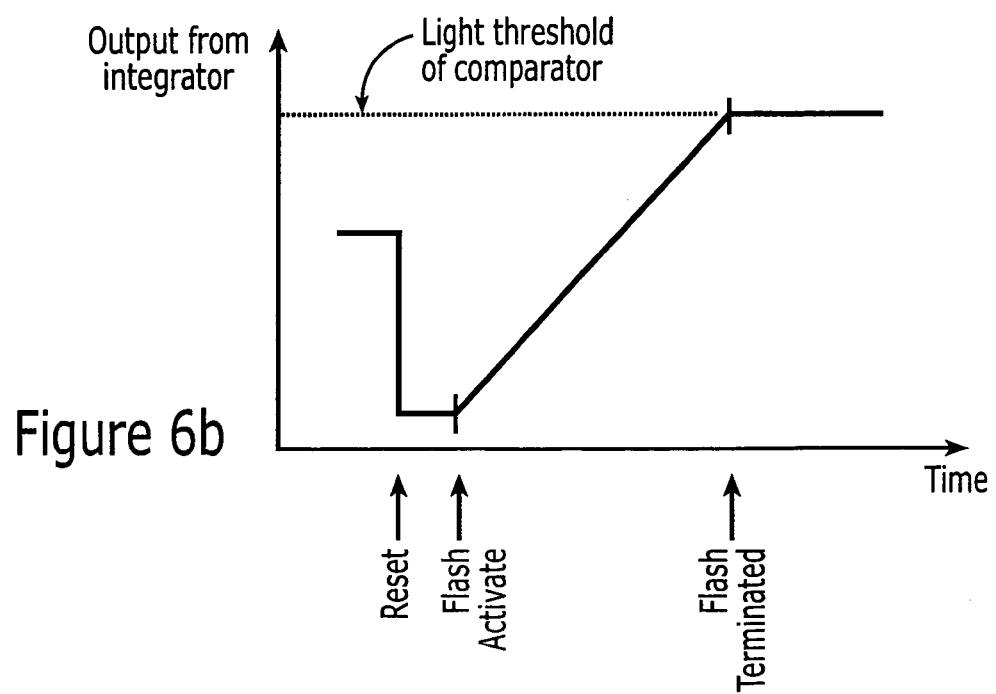
Figure 6C:

In operation, as shown in FIGS. 6A-C, the flash 255 is activated at a time $T_1$ to provide the light 253 to the subject, whereupon light 272 is reflected therefrom to the image sensor circuit 265 via the lens 270. The image sensor circuit 265 provides flash data from the array of image sensing elements. The flash data is amplified and provided to the combining circuit 375, which provides the combined flash data signal to the integrator circuit 380 as shown in FIG. 6A.

As shown in FIG. 6B, the integrator circuit 380 integrates the combined flash data signal beginning at about time $T_1$ and continuing thereafter to a time $T_2$ whereupon the comparator circuit 385 indicates that the output from the integrator circuit 380 equals or exceeds the flash threshold level provided to the comparator circuit 385. According to FIG. 6C, when the comparator circuit 385 indicates that the total flash output from the flash 255 equals or exceeds the flash threshold level, a terminate flash signal is generated thereby ceasing activation of the flash 255.

As further shown in FIG. 6B, the integrator circuit 380 is reset prior to the next activation of the flash 255 to initialize the output of the integrator circuit 380 before integration of the combined flash data signal from the combining circuit 375 begins. It will be understood that the integrator circuit 380 can be reset responsive to the comparator circuit 385 generating the terminate flash signal as shown in FIG. 6C. Accordingly, when the integrator circuit 380 begins integration of the combined flash data signal during the next activation of the flash 255, the output provided therefrom is based only on the light provided by the flash 255 during the current activation and is not influenced by previous activations.

Figure 4:
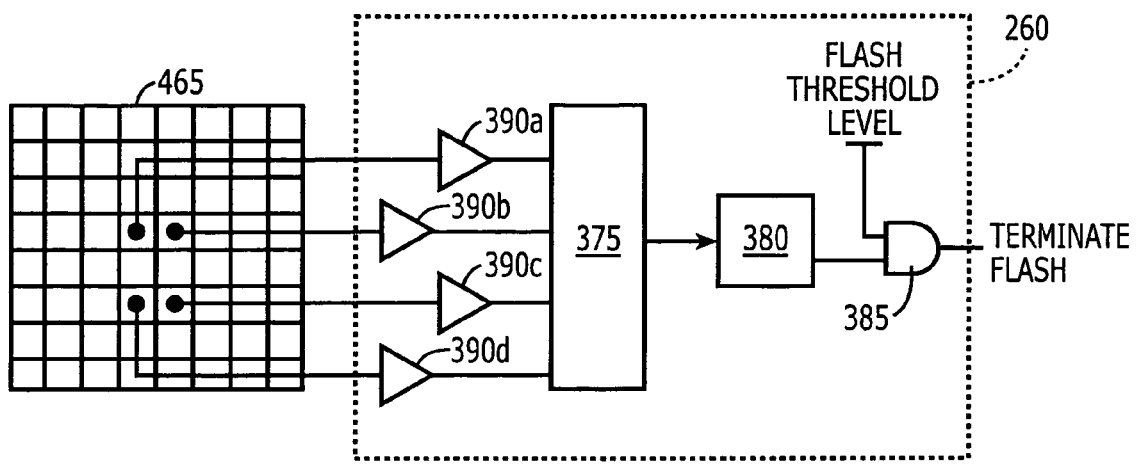

FIG. 4 is a block diagram that illustrates image sensor circuits 465 coupled to flash sensing circuits 260 in mobile terminals according to some embodiments of the invention. In particular, the image sensor circuit 465 shown in FIG. 4 is configured so that a different plurality of image sensing elements are used to measure the flash data compared to those shown in FIG. 3. In particular, the image sensing elements used to provide the flash data to the plurality of flash data amplifier circuits 390A-D are located closer to the center of the array compared to those used in embodiments illustrated in FIG. 3. It will be further understood that in other embodiments according to the invention, other arrangements of image sensing elements used to measure the flash data can be used. For example, in some embodiments according to the invention, other symmetrical type arrangements similar to those shown in FIG. 4 can be used where, for example, an image sensing element is selected from each quadrant of the array. In still other embodiments according to the invention, fewer than four elements can be used. Furthermore, the image sensing elements used to measure the flash data can be selected according to an asymmetrical pattern, such as by selecting all of the image sensing elements from one quadrant. Alternatively, a greater number of image sensing elements may be selected to be in one quadrant compared to those selected to be in other quadrants. It will also be understood that in some embodiments according to the invention, more or fewer image sensing elements may be utilized.

Figure 5:
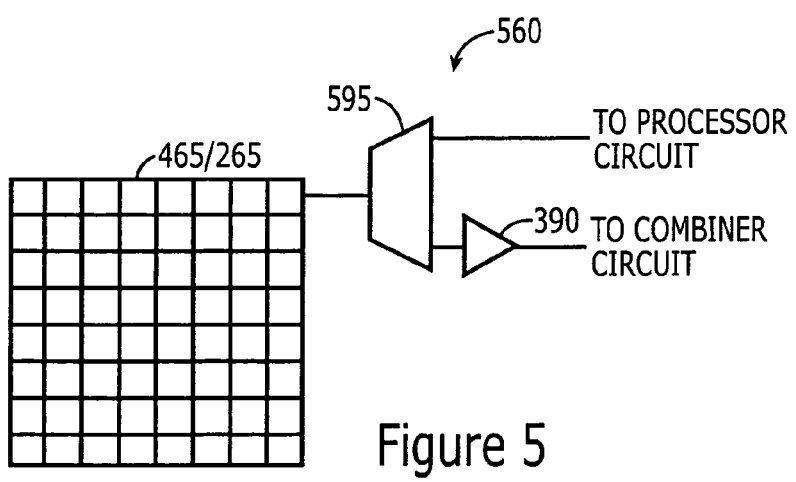
FIG. 5 is a block diagram that illustrates image data/flash data switching circuits in mobile terminals according to some embodiments of the invention.

FIG. 5 is a block diagram that illustrates image sensor circuits 465/265 coupled to image data/flash data switching circuits 595 in mobile terminals according to some embodiments of the invention. In particular, the image data/flash data switching circuit 595 can be used to provide data from a selected image sensing element to either the processor circuit 145 or to the combiner circuit 375 via the respective flash data amplifier circuit 390. Accordingly, the image data/flash data switching circuit 595 can be used to measure flash data using the same sensing elements that are used to measure image data. It will be understood that in operation the image data/flash data switching circuit 595 can be switched responsive to operation of a flash activation signal. For example, the image data/flash data switching circuit 595 can be configured to provide the output from the selected sensing element to the combiner circuit (i.e. to measure flash data) upon activation of the flash 255. However, when the comparator circuit 385 indicates that the total flash output of the flash 255 equals or exceeds the flash threshold level, the image data/flash data switching circuit 595 can be switched to provide the data from the selected image sensing element to the processor circuit 145 (i.e. as image data).

As described herein, in some embodiments according to the invention, mobile terminals can include an image sensor circuit that provides flash data to a flash sensing circuit. The flash sensing circuit can be configured to determine whether a flash has provided adequate light to a subject, whereupon the flash may be terminated. In some embodiments according to the invention, the image sensor circuit includes a plurality of first image sensing elements that are dedicated to providing image data that represent the subject illuminated by the flash and a plurality of second sensing elements that are dedicated to providing flash data to the flash sensing circuit. Accordingly, the flash data can be processed to determine whether the flash has provided adequate illumination of the subject so that the image data may be measured. In other embodiments according to the invention, the image sensing elements used to provide the flash data to the flash sensing circuit can also be used to provide image data to the processor circuit.

Furthermore, coupling the image sensing elements in the array to circuits dedicated to determining the adequacy of the light provided by the flash can allow a camera sub-system according to the present invention to operate faster than conventional approaches. For example, having some of the image sensing elements "hardwired" to amplifiers etc. used to determine whether the flash has provided adequate light can avoid the need for extensive processing by a processor circuit that operates with the sub-system.

Many alterations and modifications may be made by those having ordinary skill in the art, given the benefit of present disclosure, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed:

1. A mobile terminal comprising:
    a flash coupled to a mobile terminal housing and configured to provide light from the mobile terminal to illuminate a subject;
    an image sensor circuit, coupled to the flash, comprising a plurality of first image sensing elements configured to provide image data representative of the subject;
    a flash sensing circuit, coupled to the image sensor circuit, configured to measure the light provided by the flash using a second image sensing element in image sensor circuit;
    a processor circuit, coupled to the image sensor circuit, and configured to coordinate operation of the image sensor circuit to provide the image data representative of the subject; and
    an image data/flash data switching circuit, coupled between the image sensor circuit and the flash sensing circuit, and configured to switch the second image sensing element to the flash sensing circuit as flash data until a flash threshold level is met and then to switch the second image sensing element to the processor circuit as image data.

2. A mobile terminal according to claim 1 wherein the second image sensing element is not configured to provide image data representative of the subject.

3. A mobile terminal according to claim 1 wherein the second image sensing element is configured only to measure the light provided by the flash.

4. A mobile terminal according to claim 3 wherein the second image sensing element comprises a dedicated flash sensing element within an array of image sensing elements included in an image sensing device in the mobile terminal.

5. A mobile terminal according to claim 1, wherein the image sensor circuit includes a plurality of image data amplifier circuits coupled to the plurality of first image sensing elements to provide amplified image data representative of the subject, the flash sensing circuit further comprising:
    at least one flash sensing data amplifier circuit coupled to second image sensing element and configured to provide amplified flash data.

6. A mobile terminal according to claim 5 wherein the at least one flash sensing data amplifier circuit is located inside an image sensing device with the plurality of image data amplifier circuits.

7. A mobile terminal according to claim 5 wherein the at least one flash sensing data amplifier circuit is located outside an image sensing device that includes the plurality of image data amplifier circuits.

8. A mobile terminal according to claim 1 wherein the second image sensing element comprises a plurality of second image sensing elements selected from the plurality of first image sensing elements.

9. A mobile terminal according to claim 8 wherein plurality of second image sensing elements comprises four or more of the second image sensing elements each selected from one of four quadrants of an array of imaging sensing elements.

10. A mobile terminal according to claim 1 wherein the second image sensing element comprises a single second image sensing element selected from the plurality of first image sensing elements.

11. A mobile terminal according to claim 1 wherein the second image sensing element comprises a plurality of second image sensing elements, the flash sensing circuit further comprises:
    a plurality of flash sensing data amplifier circuits, coupled to respective ones of the plurality of second image sensing elements, and configured to provide a plurality of amplified flash data;
    a combining circuit, coupled to respective ones of the plurality of flash sensing data amplifier circuits, and configured to combine the plurality of amplified flash data to provide a combined flash data signal;
    an integrator circuit, coupled to the combining circuit, and configured to total the light provided by the flash over time to provide a total flash output signal; and
    a comparator circuit, coupled to the integrator circuit, and configured to provide a flash off signal if a level of the total flash output signal equals or exceeds the flash threshold level.

12. A cellular radio telephone comprising:
    a transceiver circuit, operative to transmit and receive radio frequency communication signals between a network and the cellular radio telephone via an antenna system;
    a processor circuit, coupled to the transceiver circuit, and configured to provide operation of the cellular radio telephone including coordination of communications via the transceiver circuit;
    a digital camera sub-system, included in the cellular radio telephone and coupled to the processor circuit, the digital camera sub-system configured to measure image data representative of a subject;
    a flash, coupled to the cellular radio telephone and configured to provide light to illuminate the subject;
    an image sensor circuit, coupled to the flash, comprising a plurality of first image sensing elements configured to provide image data representative of the subject and a plurality of second image sensing elements configured to provide flash data representative of a level of the light provided by the flash;
    a flash sensing circuit, coupled to the image sensor circuit, configured to measure the light provided by the flash using the plurality of second image sensing elements
    wherein the processor circuit is coupled to the image sensor circuit and is configured to coordinate operation of the image sensor circuit to provide the image data representative of the subject; and an image data/flash data switching circuit, coupled between the image sensor circuit and the flash sensing circuit, and configured to switch the second image sensing element to the flash sensing circuit as flash data until a flash threshold level is met and then to switch at least one of the plurality of second image sensing elements to the processor circuit as image data.

13. A cellular radio telephone according to claim 12 wherein the flash sensing circuit further comprises:
   a plurality of flash sensing data amplifier circuits, coupled to respective ones of the plurality of second image sensing elements, and configured to provide a plurality of amplified flash data;
   a combining circuit, coupled to respective ones of the plurality of flash sensing data amplifier circuits, and configured to combine the plurality of amplified flash data to provide a combined flash data signal;
   an integrator circuit, coupled to the combining circuit, and configured to total the light provided by the flash over time to provide a total flash output signal; and
   a comparator circuit, coupled to the integrator circuit, and configured to provide a flash off signal if the level of the total flash output signal equals or exceeds a flash threshold level.

14. A method of operating a digital camera sub-system in a mobile terminal, the method comprising:
   activating a flash in the mobile terminal to provide light from the mobile terminal to illuminate a subject;
   measuring the light using an image sensor circuit in the mobile terminal to provide an indication of a level of the light provided by the flash to the subject;
   measuring the light using the image sensor circuit to provide image data representative of the subject; and
   switching flash data generated by the image sensor circuit from being provided to a flash sensing circuit to a processor circuit to provide the image data representative of the subject when a flash threshold level is met by the indication of the level of the light provided by the flash to the subject.

15. A method according to claim 14 wherein integrating the combined flash data signal over time further comprises:
   resetting an integration circuit configured to integrate the combined flash data signal over time responsive to input from a user of the mobile terminal.

16. A method according to claim 14 wherein measuring the light to provide an indication of a level of the light provided by the flash comprises:
   generating flash data by the image sensor circuit;
   amplifying the flash data to provide amplified flash data;
   combining the amplified flash data to provide a combined flash data signal;
   integrating the combined flash data signal over time to provide the indication of the level of the light provided by the flash to the subject; and
   comparing the indication to the flash threshold level.

17. A method according to claim 16 further comprising:
   terminating activation of the flash if the indication equals or exceeds the flash threshold level; and
   continuing activating the flash if the indication is less than the flash threshold level.

18. A method according to claim 17 further comprising:
   switching flash data generated by the image sensor circuit from being provided to a flash sensing circuit to a processor circuit to be used to provide the image data representative of the subject.

* * * * *

UNITED STATES PATENT AND TRADEMARK OFFICE
CERTIFICATE OF CORRECTION

PATENT NO.       : 7,576,798 B2                                   Page 1 of 1
APPLICATION NO.  : 11/450227
DATED            : August 18, 2009
INVENTOR(S)      : Klinghult et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this

Seventh Day of September, 2010

David J. Kappos
*Director of the United States Patent and Trademark Office*